United States Patent [19]

Franaszek

[11] 3,727,005

[45] Apr. 10, 1973

[54] DELTA MODULATION SYSTEM WITH RANDOMLY TIMED MULTIPLEXING CAPABILITY

[75] Inventor: Peter A. Franaszek, Mount Kisco, N.Y.

[73] Assignee: International Business Machines Corporation, Armonk, N.Y.

[22] Filed: June 30, 1971

[21] Appl. No.: 158,313

[52] U.S. Cl. .........179/15 BY, 179/15 BM, 325/38 B
[51] Int. Cl. ..........H04j 3/12
[58] Field of Search ..........179/15 BY, 15 AP, 179/15 BM, 15 BW; 325/38 B

[56] References Cited

UNITED STATES PATENTS

| | | | |
|---|---|---|---|
| 3,359,372 | 12/1967 | DeBurro | 179/15 BY |
| 3,491,206 | 1/1970 | Sheridan | 179/15 AP |
| 3,586,781 | 6/1971 | Jones | 179/15 BY |
| 3,603,737 | 9/1971 | Le Dorh | 179/15 AP |

*Primary Examiner*—Ralph D. Blakeslee
*Attorney*—Charles P. Boberg et al.

[57] ABSTRACT

The principal feature of this multiplexed delta modulation system is its ability to introduce digital data or other low-frequency information signals into a high-frequency digitized signal stream at random times, without loss of synchronization or undue degradation of the high-frequency signal. When a low-frequency data bit is to be introduced into a bit stream representing the high-frequency signal, such a bit first is converted into a multibit code word W1 or W2, depending upon whether a 1 or 0 data bit is to be transmitted. The code word W1 or W2 they may be inserted into the transmitted bit stream at any random time, replacing a bit pattern of corresponding length in said stream which otherwise would represent the coincident portion of the high-frequency signal. The code word W1 or W2 is recognized as a data bit representation at the receiver regardless of where it occurs in the bit stream. If a bit pattern identical with W1 or W2, but not representing a low-frequency data bit, should appear by change in the high-frequency digitized signal, such a bit pattern is altered prior to its transmission so that it will not be mistaken for a data bit at the receiver. The delta modulation process automatically is adjusted to compensate for: (1) any difference between the numerical weight of an introduced bit pattern W1 or W2 and the numerical weight of the bit pattern which it replaces, or (2) in the case of a bit pattern fortuitously identical with W1 or W2, the difference between the respective numerical weights of such a bit pattern before and after its alteration.

8 Claims, 5 Drawing Figures

INVENTOR
PETER A. FRANASZEK

BY Charles P. Boberg
ATTORNEY

DELTA MODULATION SYSTEM WITH RANDOMLY TIMED MULTIPLEXING CAPABILITY

BACKGROUND OF THE INVENTION

In a delta-modulated communication system, the signal to be transmitted (usually an analog signal) is digitized or quantized into a stream of bits which subsequently may be reconstructed into a wave form approximating that of the original signal. In this wave reconstruction process, the "1" bits, for example, may cause the wave amplitude to change incrementally in a positive sense, while the "0" bits cause it to change incrementally in a negative sense. The resultant stepped wave envelope should follow the original wave envelope with reasonable accuracy. In a feedback loop at the transmitting end of a delta modulation system, a stepped wave envelope is constructed from the bits which are to be transmitted, and this envelope is continuously compared with the original wave envelope to control the generation of 1 or 0 bits as may be needed in order to construct the desired signal waveform at the receiving end of the system.

Often it is desired to multiplex a delta-modulated signal having a very high bit-transmission frequency (such as a video signal) with another digitized signal requiring on the average a much lower bit-transmission frequency. For instance, it may be desired to transmit a video signal occasionally interspersed with transmissions of voice or digital data. Any such multiplexed transmission will cause some degradation of the high-frequency signal transmission, and it also will introduce the problem of synchronizing the transmitter and receiver with respect to the data which is introduced into the high-frequency bit stream. To minimize signal degradation and handle the synchronization problem, it has been customary to use a time-division multiplexing technique whereby infrequent but regularly occurring time slots are set aside for the introduction of low-frequency information bits into the delta-modulated bit stream. This has not proved to be a highly satisfactory solution. Among its shortcomings, the following may be mentioned:

First, elaborate framing and clocking arrangements must be utilized in order to condition such a system for detecting the occasional low-frequency information bits that are interspersed with the high-frequency signal transmission. Information bits can easily become lost in this detection process if the counter circuitry is not functioning perfectly. Synchronization then becomes subject to chance during an undesirable high percentage of the time. Second, in many instances it may be inconvenient or undesirable to have low-frequency information bits transmitted on a regularly occurring basis. Randomly timed transmission of such bits may, in general, be more desirable. However, conventional multiplexing systems are not adapted for introducing low-frequency data at random times into the signal transmission.

SUMMARY OF THE INVENTION

A principal object of the invention is to improve the performance of multiplexed delta-modulation systems by eliminating the need to accomplish the multiplexing of high-frequency and low-frequency digitized signals on a fixed time-division basis. In particular, it is an object to provide a reliable way of transmitting the low-frequency signal elements at random times and in a self-synchronizing manner.

The invention is based upon the concept of converting individual low-frequency signal bits, herein referred to generically as "data bits," into distinctive multibit patterns, herein termed "data words," prior to their being introduced into the delta-modulated high-frequency bit stream. These data words may be inserted at random times into the bit stream, where they are unmistakably recognized as representations of low-frequency data bits regardless of when they occur. In this system there is no need to look for data bits at predetermined cyclic times, as must be done in conventional multiplexed systems, and as a consequence the synchronization procedure is greatly simplified and made more reliable. The relatively infrequent occurrence of such data words in the signal transmission insures that they will not overlap.

In the course of generating a high-frequency delta-modulated bit stream, there may occur by chance a bit sequence that resembles one of the predefined data words. To prevent any malfunction that otherwise could be caused by such an occurrence, the bit sequence in question automatically is altered to a slight degree, so that it no longer simulates a data word, before being transmitted to the receiver.

Any multiplexing operation is apt to cause intermittent degradation of the high-frequency signal. The present invention minimizes such degradation. The numerical weight of each introduced data word (e.g., the number of 1's contained therein) is compared with the numerical weight of the high-frequency bit sequence that it replaces. Any difference in weight is fed back as a compensatory signal to the modulator, thereby modifying the generation of the high-frequency bit sequence immediately following the introduction of the data word in order to compensate for this discrepancy. Similarly, if a particular bit sequence in the delta-modulated high-frequency signal has been altered to prevent its being mistaken for a data word, the resulting change in weight likewise is fed back as a compensatory signal to the modulator. As a result, the wave envelope of the reconstructed analog signal at the receiver will closely follow that of the original analog signal despite the use of even fairly long data words (e.g., 8-bit bytes) in the multiplexed signal transmission.

The foregoing and other objects, features and advantages of the invention will be apparent from the following more particular description of a preferred embodiment of the invention, as illustrated in the accompanying drawings.

DETAILED DESCRIPTION OF PREFERRED EMBODIMENT

The delta modulation principle has been known for at least 25 years, and a detailed discussion of this principle is considered unnecessary herein. Briefly, the effect of an analog signal is simulated by transmitting a series of 1 and 0 bits in a pattern which will cause an integrator to construct a waveform approximating that of the original analog signal. In practice, the 1 bits generally are transmitted as positive-going voltage pulses of fixed amplitude, while the 0 bits are transmitted as negative-going voltage pulses of fixed amplitude, and this will be the mode of operation assumed herein, although it is not the only way of accomplishing delta modulation. The word "delta" implies that the reconstructed waveform is built up of going and negative-going increments each of magnitude Δ (delta). The value of Δ may be subject to occasional adjustment to meet the current needs of the communication system, as will be mentioned.

Figure 1:
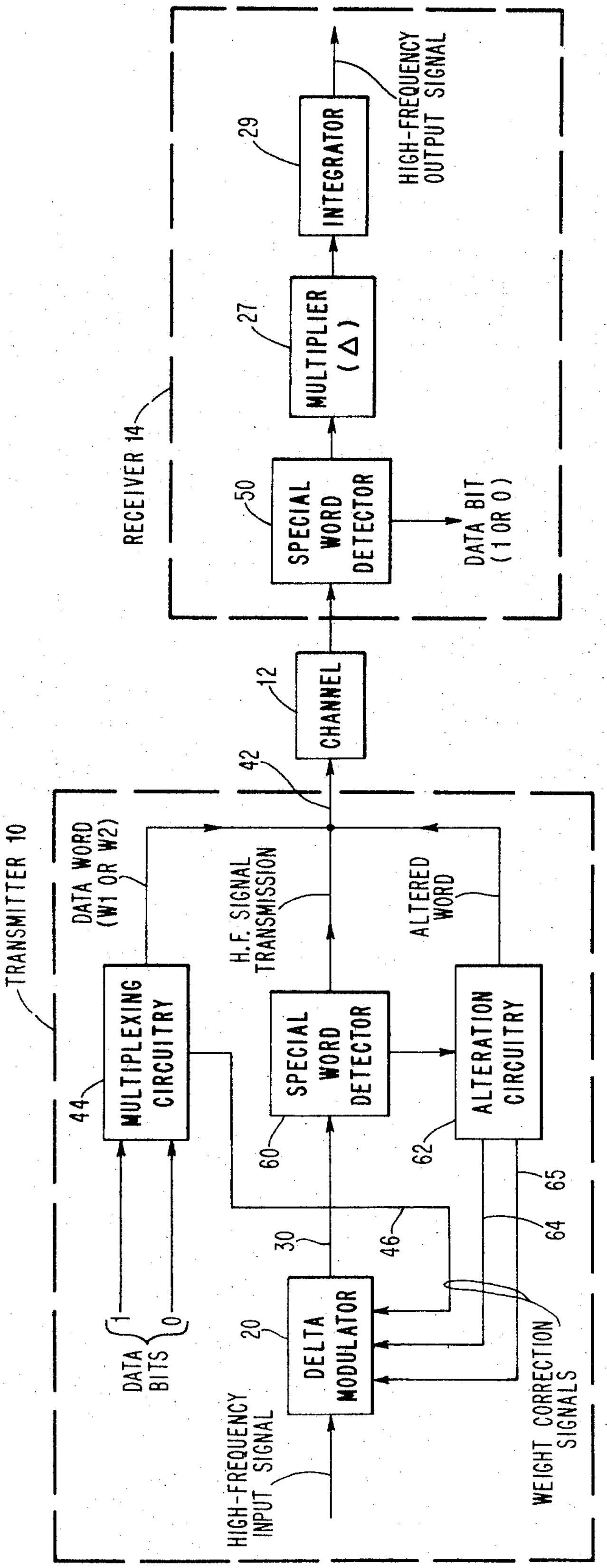
FIG. 1 is a general diagramatic representation of a multiplexed delta-modulation type of communication system which embodies the principle of the invention.

FIG. 1 shows in a general way the layout of a communication system of the delta modulation type which embodies the improvements effected by the present invention. Under normal conditions a high-frequency input signal, usually of the analog type, is converted by the transmitter 10 into a corresponding train of 1 and 0 bits, which are sent through the channel 12 in the form of positive-going and negative-going pulses, respectively. The receiver 14 reconstructs this train of pulses into a signal having a stepped waveform that closely approximates the waveform of the original signal. This output signal may be passed through a low-pass filter (not shown) for final smoothing of the waveform if desired. Transmitter 10 contains a delta modulator 20, lower half of FIG. 4A, comprising four principal elements, namely, an inverter-adder 22, a threshold comparator or quantizer 24, a multiplier 26 and an integrator 28. The threshold comparator 24 is the key element of this combination. It converts any input voltage of variable amplitude exceeding a given threshold value into a positive output voltage of fixed amplitude, and it converts any input voltage of variable amplitude less than said threshold value into a negative output voltage of fixed amplitude. It is assumed herein that the threshold value is zero voltage, so that the polarity or algebraic sign of the modulator output voltage appearing on wire 30, which leads from comparator 24, is the same as that of the input voltage on wire 31 leading to comparator 24. Whatever difference there is between these input and output voltages will be one of amplitude only.

Figure 4A:
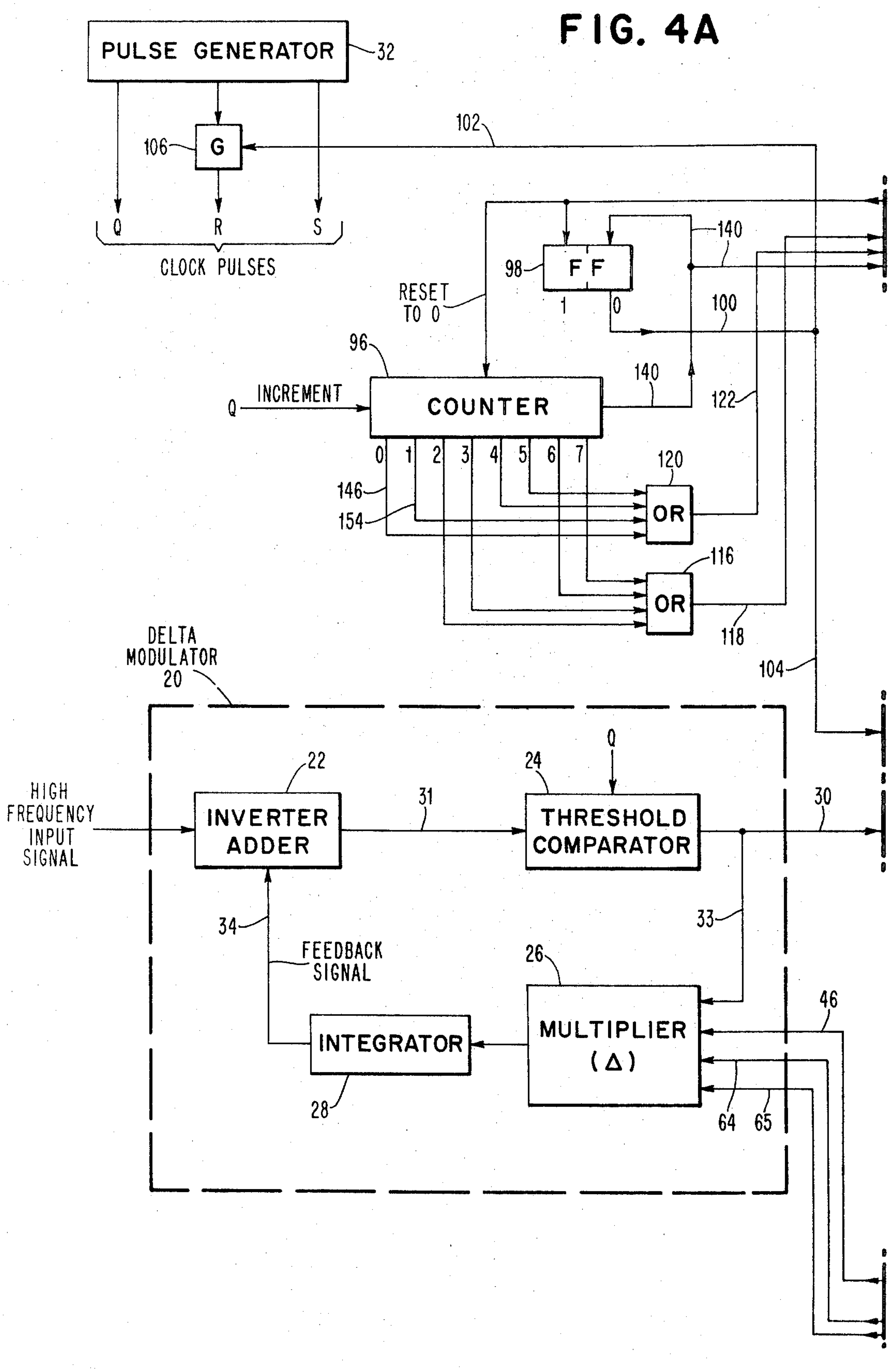
FIGS. 4A and 4B together constitute a more detailed showing of the transmitter circuitry included in the system of FIG. 1

At regular intervals having a time separation of T, the voltage generated by comparator 24 is "sampled" by clock pulses herein designated "Q" pulses, which are furnished by a pulse generator 32 shown in the upper part of FIG. 4A. This sampling operation shapes the output of comparator 24 into a series of positive-going and negative-going pulses on the output wire 30 of modulator 20. The positive-going pulses are herein regarded as "logical 1" bits, while the negative-going pulses are regarded as "logical 0" bits. This convention has been found useful for explaining the operation of a multiplexed delta-modulation system such as the present one in which digital data is intermingled with digitized analog information.

The polarity or algebraic sign of the input voltage that is delivered at any given instant through wire 31 to the comparator 24 is determined by the relationship between the instantaneous value of the high-frequency input signal to the modulator 20 (such as a video signal or other rapidly changing analog signal) and the instantaneous value of a feedback voltage generated in a feedback loop comprising the multiplier 26 and integrator 28. The modulator output pulses on wire 30 are applied through wire 33 as input to multiplier 26, which multiplies the amplitude of such pulses by a preselected factor (related to the current size of Δ) and applies the resultant pulses to integrator 28. Integrator 28 constructs a feedback signal having a stepped voltage waveform from these pulses and applies the same through wire 34 as one of two inputs to the inverter-adder unit 22, the other input to unit 22 being the high-frequency analog input signal. The unit 22 inverts the sign of the feedback signal voltage and adds the resultant voltage to the input signal voltage. The result of this addition determines the sign and magnitude of the voltage supplied by unit 22 through wire 31 to the threshold comparator 24.

The operation of the modulator 20 is such that the modulated signal on wire 30, FIG. 4A, takes the form of a pulse train which, when passed through a multiplier such as 26 and an integrator such as 28, will produce a stepped voltage wave on wire 34 whose envelope closely follows that of the high-frequency analog signal applied as input to the modulator 20. The receiver 14, FIG. 1, has a similar combination of a multiplier 27 and integrator 29 for converting the received delta-modulated pulse train into a stepped voltage wave. Normally the wave forms of these two stepped voltage waves should be identical. However, during those times when low-frequency data is being multiplexed into the signal transmission, or when a portion of the transmitted signal is being altered to avoid simulating a data signal as explained hereinafter, there will be in each such instance a limited period during which the output voltage waveform of the receiver 14 differs from the feedback voltage waveform within the delta modulator 20. This will be more fully described subsequently herein.

Figure 2:
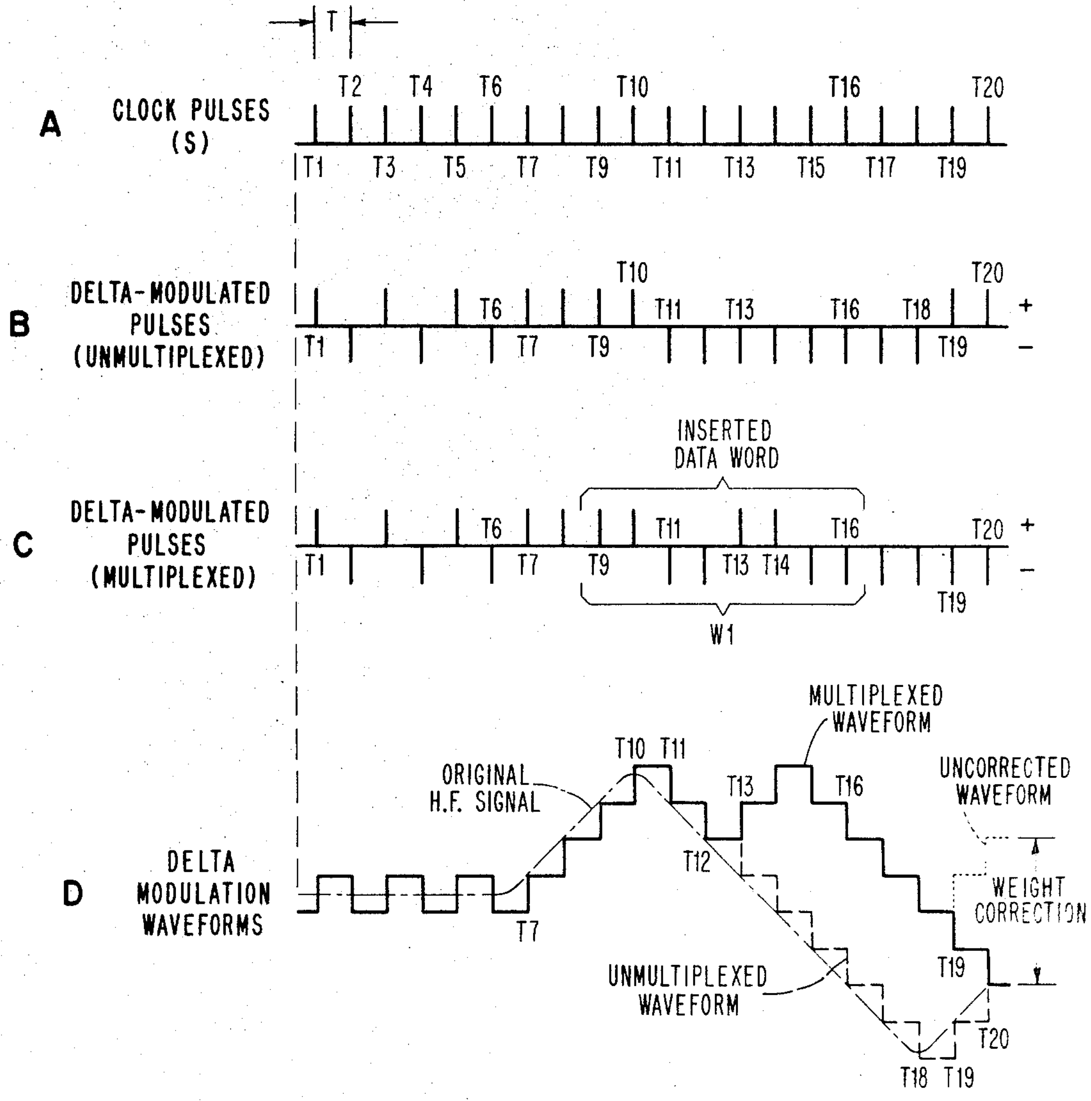
FIG. 2 is a set of graphs drawn on the same time base and depicting the operation of the system when a data word is introduced into the high-frequency signal transmission, showing in particular how a weight correction is applied to the delta-modulation process for limiting the waveform deformation caused by introduction of the data word.

An example of the action of modulator 20 is depicted in FIG. 2. The "unmultiplexed delta modulation waveform" shown in FIG. 2D represents the waveform that would be reconstructed by the receiver 14, FIG. 1 (i.e., the output of integrator 29) in response to the unmultiplexed delta-modulated pulse train shown in FIG. 2B. It also represents the waveform of the feedback signal on wire 34 within the delta modulator 20, FIG. 4A, under conditions when no low-frequency data is being transmitted. This unmultiplexed delta-modulation waveform follows the applied high-frequency analog signal waveform. During periods when low-frequency data is being transmitted, and also during any waveformecorrecting period which may follow each such transmission, there will be temporary discrepancies between the waveform of the feedback signal on wire 34 in modulator 20, FIG. 4A, and the waveform of the output signal produced by receiver 14, FIG. 1. The present invention minimizes the time during which such discrepancies exist. It is the function of the weight correction signals, FIG. 1, which will be described hereinafter, to bring the transmitted signal waveform into agreement with the high-frequency input signal waveform in the shortest feasible time after each item of low-frequency data is transmitted.

The main objective of the invention, as explained hereinabove, is to enable data or other low-frequency signals, such as digitized voice signals, to be multiplexed at random times into the high-frequency delta-modulated signal transmission. To understand how this is accomplished, attention will be given first to the procedure normally followed for transmitting a high-frequency analog signal (such as video) in the absence of multiplexing.

Figure 4B:
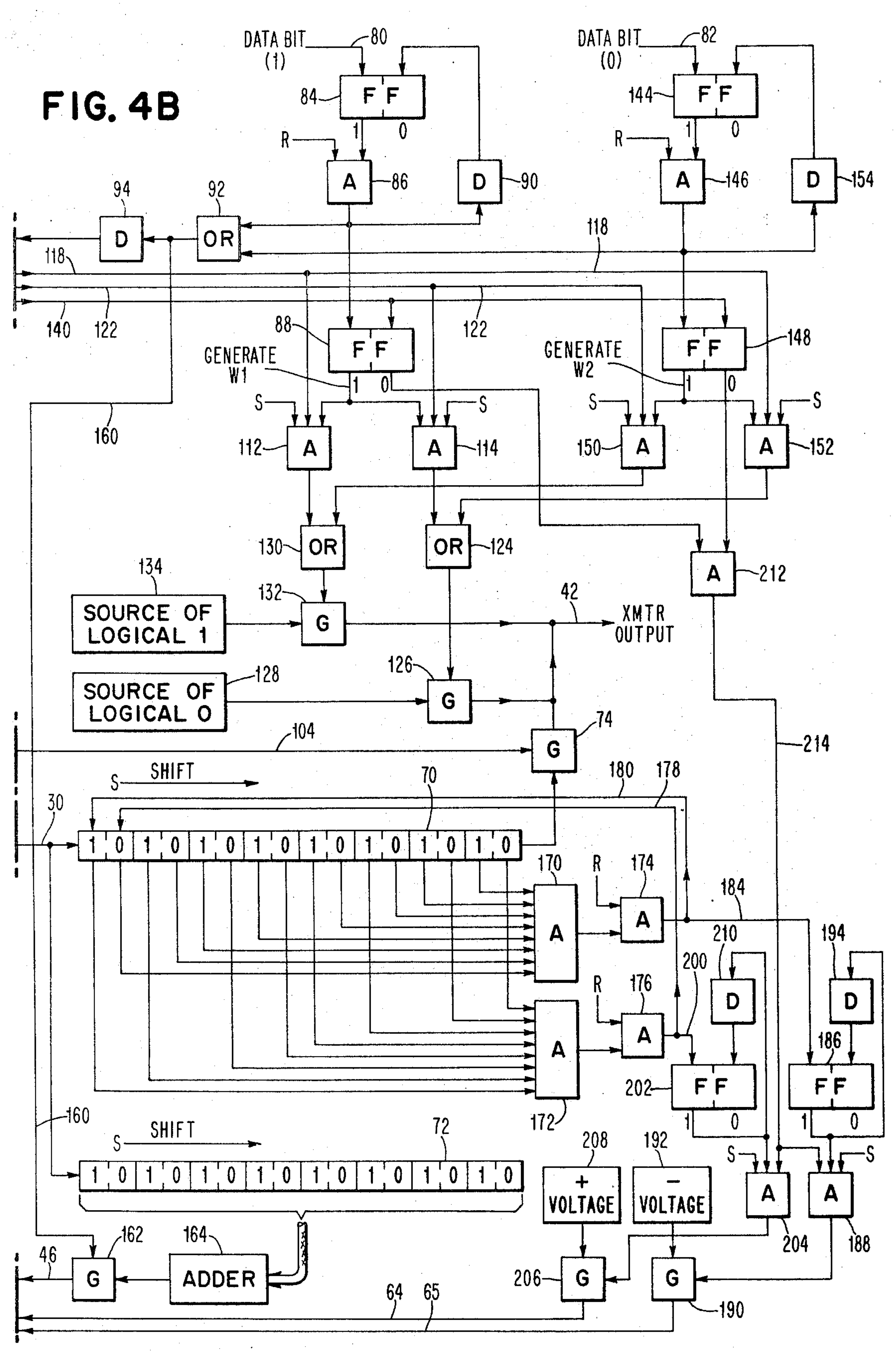

Referring to FIG. 4A, clock pulses herein designated "Q pulses" are generated at uniform time intervals of duration T by suitable means such as the pulse generator or clock 32 and are applied to the threshold comparator 24 to effect a "sampling" of the threshold comparator output voltage at regularly recurring times. The resulting train of positive and negative pulses produced on the modulator output line 30, FIGS. 4A and 4B, represents in digitized or quantized fashion the variations of the high-frequency signal amplitude. During transmission, the timing of the signal pulses is controlled by another series of clock pulses S, FIG. 2A, which are generated at times T1, T2, etc. by clock 32. A typical delta-modulated pulse train is shown in FIG. 2B as an example. As mentioned above, this pulse train normally would yield at the receiver a reconstructed waveform as indicated by the notation "unmultiplexed delta modulation waveform" in FIG. 2D, which closely follows the original high-frequency signal.

It will be noted in FIG. 2 that when the amplitude of the input signal is at zero level (or any other constant level), the delta-modulated pulse sequence consists of alternate positive and negative pulses, as shown during the clock times T1 through T6, FIGS. 2B and 2D, the net effect of which is zero. If the input signal amplitude undergoes a sustained rise in amplitude, as during the clock times T7 through T10, FIG. 2D, a corresponding sequence of positive pulses is produced in the delta-modulated pulse train, FIG. 2B. If the input signal amplitude undergoes a sustained decline, as between the clock times T11 and T18, FIG. 2D, a corresponding sequence of negative pulses would be produced in the unmiltiplexed output pulse train, FIG. 2B, and this is the actual pulse sequence applied during these times to the feedback loop 33–26–28–34 of the delta modulator, FIG. 4A.

Whenever a low-frequency data bit is to be introduced into the quantized high-frequency signal, multiplexing circuitry 44, FIG. 1, first converts the input 1 or 0 bit, as the case may be, into a data word W1 or W2, respectively, which in the present illustrative embodiment is assumed to be an 8-bit "byte" having a distinctive pattern or configuration that can be recognized regardless of when it occurs. Inasmuch as the randomly timed data bits cannot be distinguished from high-frequency signal bits on the basis of their timing, they must be distinguished on some other basis. In the present embodiment this is accomplished by converting each data bit into a distinctive bit pattern. Thus, a "1" bit is represented by the pattern 11001100, herein identified as the data word W1, while a "0" bit is represented by the inverse or complemental bit pattern 00110011, herein identified as the data word W2.

It is also possible to operate in such a way that only the "1" bits are recognized, and the "0" bits are ignored, somewhat similar to the manner in which 1 bits are utilized and 0 bits disregarded in NRZI recording. Although this mode of operation is not specifically disclosed herein, it will be apparent from the present teachings that it could readily be put into practice if desired.

The data words W1 and W2, in the present example, have bit patterns which contain equal numbers of 1 and 0 bits. If the "weight" of a word is defined as the preponderance of 1's over 0's, or vice versa, then each word W1 or W2 has a "weight" of zero. It is believed that these are the optimum choices of bit patterns for W1 and W2, but if experience should indicate that different choices would be better, these may be adopted without departing from the spirit of the invention. The use of data words having zero weights has been found to simplify the circuitry needed to effect weight corrections in accordance with the present teachings, as will be appreciated from the more detailed description which follows.

When a data word W1 or W2 is introduced into the signal transmission by the multiplexing circuitry 44, FIG. 1, it is substituted for the bit pattern that would have been transmitted during the time period in which this data word is being generated. For instance, referring to FIG. 2, assume by way of example that data word W1 is introduced into the delta-modulated pulse stream during the period extending from clock time T9 through clock time T16, as shown in FIG. 2C. If W1 had not been thus introduced, a different pulse pattern would have been transmitted, as indicated between T9 and T16 in FIG. 2B. Observing the convention that positive pulses represent 1 bits while negative pulses represent 0 bits, it will be seen that the data word W1, or 11001100, has replaced the bit pattern 11000000 that normally would have been transmitted if W1 had not been introduced into the transmission at that particular time. Thus, the data word W1, with a weight of zero, has replaced a bit pattern that would have had a net weight of minus-4.

The effect of introducing W1 into the signal transmission is shown in FIG. 2D. Instead of following the unmultiplexed or feedback signal waveform, the multiplexed output waveform which is reconstructed by the receiver 14 from the pulse train of FIG. 2C will depart from the unmultiplexed signal waveform at T13. At T16, when data word W1 ends, the amplitude of the multiplexed signal will be four delta-increments higher than it would have been had the data word W1 not been inserted into the transmission. This same result would have occured if W2 had been transmitted instead of W1, since both W1 and W2 are assumed herein to have the same net weight of zero. Thus, as a result of transmitting the data word at this particular time, the output waveform amplitude is four increments higher than it should be in order to truly represent the original high-frequency signal.

As mentioned above, the present invention makes provision for correcting the weight of the output signal to remove this discrepancy at the earliest feasible time following the introduction of the data word. Referring to FIG. 1, the multiplexing circuitry 44, at the time when it introduces the data word W1 or W2, senses the weight of the 8-bit pattern which is being replaced by that data word. Such weight represents the amount of amplitude correction which will be needed, since the introduced data word has zero weight. This weight correction signal is fed into the delta modulator 20, as indicated by the line 46 in FIG. 1. In response to such input, the modulator 20 applies a weight correction signal to the feedback loop of the delta modulator 20. Hence, instead of following its normal unmultiplexed waveform configuration, the feedback signal waveform temporarily is changed to force a corresponding change in the transmitted pulse train, thereby causing the output signal waveform at the receiver to return eventually to the waveform of the high-frequency input signal.

Referring to the specific example shown in FIG. 2, the unmultiplexed delta-modulated pulse train shown in FIG. 2B would have ended its series of negative pulses at time T18 and then would have initiated a series of positive pulses at time T19. It is not desirable to have positive pulses at times T19 and T20 in the case of the multiplexed signal (FIG. 2C), however, because this would produce the "uncorrected waveform" indicated by dotted lines in FIG. 2D, thereby continuing the discrepancy between the true high-frequency signal waveform and the waveform actually constructed by the receiver from the multiplexed pulse train. The weight correction feature (to be described in detail hereinafter) operates in such fashion that, in the presence example, it causes two negative pulses to be substituted for the two positive pulses that otherwise would have occurred in the delta-modulated pulse train at times T19 and T20. This may be seen by comparing FIG. 2C with FIB. 2B. Reversing the polarity of these two pulses at T19 and T20 effects a weight correction of four increments, as indicated in FIG. 2D, causing the output waveform to return to the proper level by time T20.

In the particular example just discussed, the deformation of the high-frequency signal waveform caused by introduction of the 8-bit data word therein between times T9 and T16 was entirely corrected at time T20, four pulse periods following the transmission of the data word. In other instances, depending upon the nature of the bit pattern which is replaced by the 8-bit data word and the pattern of the bits which follow it, a greater or less time may be required for effecting such a correction, but in any event it will be accomplished with the least possible delay.

At the receiver 14 the incoming delta-modulated pulse train is passed through a special word detector 50, the construction of which is similar to that of a unit 60 employed for a like purpose in the transmitter 10, as will be described subsequently. The detector 50 makes no change in the received pulse pattern, but each time an 8-bit pattern identical with a data word W1 or W2 appears in the incoming bit stream, the detector 50 interprets this as a received 1 or 0 data bit, as the case may be. Such data bits may be used for a variety of purposes, including but not being restricted to data transmission as such. They may, for example, also constitute digitized voice signals. Another possible use of such data is to adjust the magnitude of the multiplication factor of the multiplier units 26 and 27 in the transmitter and receiver, respectively, FIGS. 4A and 1, thereby to control the incremental value Δ, if such control is needed.

The insertion of data bits into the transmission may be done at random times because, in accordance with the invention, each data bit is converted into a distinctive 8-bit pattern or "word" W1 or W2, which is recognizable by the special word detector 50 in the receiver 14, FIG. 1, regardless of where it occurs in the received pulse train. It is possible, of course, for a pulse sequence resembling a data word W1 or W2 to occur entirely by chance in the transmitted pulse train at a time when no low-frequency data element is being transmitted. The occurrence of a spurious W1 or W2 bit pattern in the unmultiplexed portion of the transmitted pulse train would cause a malfunction of the receiver by producing an erroneous data output. To prevent such an occurrence, the present system has provisions for detecting a spurious data word pattern and altering the same prior to its transmission, so that it will not be mistaken for a data word at the receiving end of the system. This is the function of the special word detector 60 and alternation circuitry 62 in the transmitter 10, FIG. 1.

Figure 3:
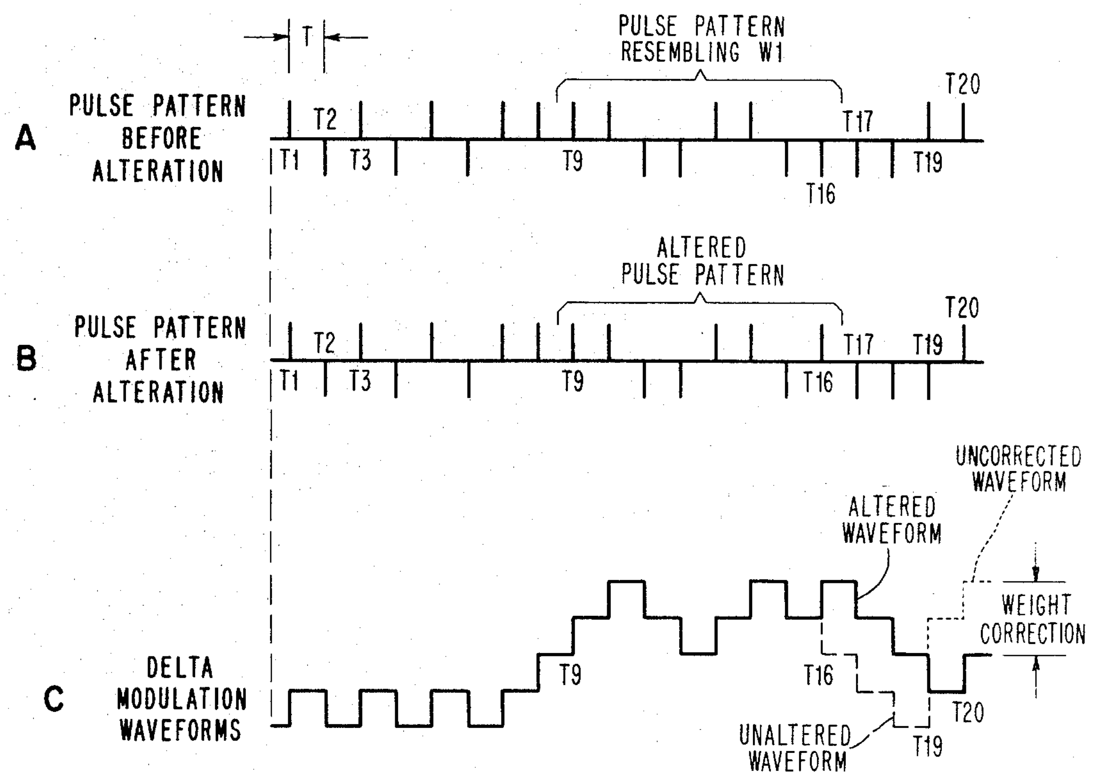
FIG. 3 is a set of graphs drawn on the same time base and depicting the operation of the system when a portion of the high-frequency signal is altered to avoid simulating a data word, showing in particular how a weight correction is applied to the delta-modulation process for limiting the waveform deformation caused by such alteration.

Referring now to FIG. 3, which illustrates a typical alternation procedure, it is assumed that the high-frequency pulse train generated by the delta modulator contains a pulse pattern resembling W1 which occurs by chance between pulse times T9 and T16, when no data word is being generated by the multiplexing circuitry. According to the present teachings, this pulse pattern must be altered prior to its transmission so that it will not be erroneously identified as a data word by the receiver. It is proposed herein to accomplish this alteration merely by inverting the final bit of any unmultiplexed bit pattern which resembles a data word W1 or W2. In the present example this involves changing the final bit of the spurious W1 bit pattern from 0 to 1.

At this point it may be well to restate the relationship between the terms "bit" and "pulse" as they are used herein. For present descriptive purposes it is being assumed that a 1 bit is represented during transmission by a positive pulse, while a 0 bit is represented by a negative pulse. The pulse handling equipment is adapted to recognize these equivalences wherever necessary. The expressions "bit pattern" and "pulse pattern" therefore are considered to be synonymous within the context of the present teachings.

Continuing with the operational example illustrated by FIG. 3, the alteration of the pulse pattern in question is effected by inverting the pulse at time T16, thereby changing its polarity from negative to positive (FIGS. 3A and 3B). This has the effect shown in FIG. 3C, where the altered waveform is shown deviating from the unaltered waveform at T16. At this time the altered waveform has an amplitude which is two increments higher than the unaltered waveform would have at this point. To compensate for this change of signal level, the alteration circuitry 62, FIG. 1, sends an appropriate weight correction signal (as indicated by the line 64 or 65) to the delta modulator 20, indicating that the altered signal level eventually must be changed by two increments in order to attain the correct level. To achieve this, the first positive pulse which occurs in the delta-modulated pulse train following the altered bit will be changed to a negative pulse, thereby effecting a net reduction of two increments in the signal level. In the present example this occurs at time T19, when the positive pulse that normally would have been generated (FIG. 3A) is now replaced by a negative pulse (FIG. 3B).

Another way of stating this is that the cumulative net weight of the pulse train has been restored to the correct value. If this weight correction had not been effected, the waveform constructed by the receiver from the delta-modulated pulse train would continually disagree with the waveform of the original high-frequency signal following the alteration of spurious data word. FIG. 3C shows how the uncorrected waveform (dotted line) would have deviated from the true waveform (solid line) following the alteration.

When the altered pulse train passes through the special word detector 50 of the receiver 14, there will be no response by this detector to the bit pattern in question, since it no longer resembles a data word. Thus, the receiver has been prevented from generating a false data bit in its low-frequency output. The alteration of the high-frequency signal waveform is confined to only a few pulse periods (from T16 to T19, FIG. 3, in the present example).

TRANSMITTER CIRCUITRY

FIGS. 4A & 4B

Thus far the operation of the transmitter 10 has been described in a functional way, giving particular attention to the operation of the delta modulator 20 but not specifically describing the circuitry contained within the other units numbered 44, 60 and 62 in FIG. 1, which enable the transmitter to perform the unique functions that are required of it in order to carry out the purpose of this invention. The latter circuitry now will be described with reference to the detailed circuit diagram shown in FIGS. 4A and 4B. In so doing, however, no attempt will be made to identify the respective parts of the circuitry shown in FIGS. 4A and 4B with the functional units designated 44, 60 and 62 in FIG. 1. To make such a segregation would tend to complicate the showing of the transmitter circuitry in FIGS. 4A and 4B. It will be apparent from the description which follows that the circuitry shown in FIGS. 4A and 4B is the functional equivalent of the transmitter apparatus 10 shown more generally in FIG. 1.

Mention has been made of the pulse generator 32, FIG. 4A, which furnishes the clock pulses for timing the operations of the various transmitter elements. These clock pulses are designated Q, R and S, and they are generated cyclically in that order under normal conditions. Under special conditions to be described presently, the emission of R pulses is inhibited for limited times. It has been mentioned hereinabove that the Q pulses are applied to the threshold comparator 24, FIG. 4A, to sample the output voltage thereof and form a train of positive and negative pulses (as shown in FIG. 2B or 2C, for example) which constitutes the delta-modulated signal. The Q phases also serve other timing functions as will be explained presently. The R pulses have certain resetting and gating functions which will be described hereinafter. The S pulses time the operations of certain shift registers (to be described) and control the gating of various information-representing pulses onto the output line of he transmitter.

As the delta-modulated pulse train is generated, it exits from the delta modulator 20 on output wire 30, FIGS. 4A and 4B, and simultaneously enters two shift registers 70 and 72, FIG. 4B, and simultaneously enters two shift registers 70 and 72, FIG. 4B, which are arranged to receive identical inputs. In the absence of alteration, the contents of these registers 70 and 72 remain identical. Each shift register 70 or 72 comprises a series of eight flip-flops settable to store 1 and 0 bits as may be required. It will be recalled that a positive input pulse is stored in the form of a binary 1, and a negative input pulse is stored in the form of a binary 0, under the conditions of operation which are assumed herein. Periodically the contents of each of the registers 70 and 72 are simultaneously shifted in the direction indicated by the arrows marked "shift", FIG. 4B, in response to the "S" clock pulses emitted by the pulse generator 32, FIG. 4A. Each shift operation causes the bit stored in the final or eighth position of the respective shift register to exit from the register.

In the case of the register 70, the exiting bit normally passes through a gate 74 to the transmitter output line 42, but under some conditions (to be described hereinafter) the gate 74 is disabled to prevent the bit which then is exiting from the shift register 70 from entering the transmitted bit stream. Periodically the pattern of bits stored in register 70 is tested to determine whether by chance the delta modulator has generated an 8-bit sequence that is identical with a low-frequency data word W1 or W2. The consequences of detecting such an occurrence will be explained presently. In the normal course of events, when no data word is being introduced and none has been inadvertently generated, the output of the delta modulator 20, consisting of a pulse train representing the high-frequency input signal, is passed serially through the shift register 70 and gate 74 to the transmitter output line 42.

The other shift register 72 serves as an 8-bit store and functions as part of a circuit for generating a weight correction signal whenever a low-frequency data word is being introduced into the transmission. The bits leaving register 72 are discarded. The bits which currently are stored in register 72 are "weighed" (that is, summed in a way such as to indicate the excess of 1's over 0's) whenever a data word is being introduced into the transmission, thereby to determine the net weight of the bit pattern which is being replaced by the 8-bit zero-weight data word. A detailed description of a transmitter operation which involves this function now follows.

INTRODUCING A DATA BIT

At any random time a low-frequency data bit may be introduced into the bit stream of the delta-modulated high-frequency analog signal. Each such data bit is encoded into an 8-bit data word before becoming part of the transmitted signal. To enter a data bit, the wire 80 or 82 (top of FIG. 4B) is pulsed, depending upon whether a 1 or 0 bit is to be entered.

Assuming for the present that a "1" is being entered, the momentary energization of wire 80 sets flip-flop 84 to its 1 state for thereby applying an enabling signal to AND circuit 86. Then, when the next R pulse is generated by the clock 32, FIG. 4A, this pulse passes through the enabled AND circuit 86 to a flip-flop 88 for setting the latter to its 1 state. At the same time, the AND circuit 86 also passes the R pulse to a delay device 90 and, through an OR circuit 92, to another delay device 94. One of these delayed R pulses resets the flip-flop 84 to 0; the other one resets a counter 96, FIG. 4, to its 0 setting (if it is not already set to 0) and also sets a flip-flop 98 to 1.

As flip-flop 98 is set to 1, it removes energization from its 0 output wire 100 and the connected wires 102 and 104, thereby disabling a gate 106 which controls the emission of R pulses from the clock 32 and also disabling gate 74 which normally conducts the pulses of the high-frequency pulse stream from shift register 70 to the transmitter output line 42. Thus, the entry of a data bit into the system inhibits any further emission of the R clock pulses and also inhibits the transmission of delta-modulated high-frequency signal pulses for a predetermined time interval (specifically, for eight pulse periods) following such a data bit entry.

The system now prepares to transmit the 8-bit code sequence 11001100, constituting the data word W1, which represents in a recognizable code format the "1" data bit that is being multiplexed into the high-frequency signal transmission. This 8-bit code sequence will be substituted for the 8-bit sequence in the delta-modulated high-frequency bit stream that normally would have been transmitted following the instant when the data bit was presented to the system. The flip-flop 88, FIG. 4B, now is in its 1 state as explained above, wherein it partially enables two AND circuits 112 and 114. There are two other inputs to each of these AND circuits, one of them being the S clock pulses. The third input to AND circuit 112 is a parallel OR'ed input from the stages 2, 3, 6 and 7 of the counter 96, FIG. 4A, delivered through an OR circuit 116 and wire 118. The third input to AND circuit 114 is a parallel input from stages 0, 1, 4 and 5 of counter 96, delivered through an OR circuit 120 and wire 122.

When the setting of counter 96 is 0, as it is at the present time, an output voltage is furnished from the 0 counter stage through OR circuit 120 and wire 122 to AND circuit 114. Then, when the S clock pulse is generated, it passes through AND circuit 114 and OR circuit 124 to a gate 126 which is interposed between the output line 42 and a source 128 of "logical 1" signals. Inasmuch as it has been assumed herein that a logical 1 is represented by a positive pulse, the logical-1 source 128 may be a source of positive voltage. While the S clock pulse is being applied to the enabled AND circuit 114, the gate 126 passes a positive voltage pulse from source 128 to line 42. This represents the first bit (1) of the code word W1 which is to be transmitted.

The Q clock pulse which follows now advances the setting of counter 96 from 0 to 1. This again results in the passage of a positive pulse representing a 1 bit from source 128 to output line 42. Thus, the first 2 bits (11) of W1 have been transmitted. Counter 96 is advanced from 1 to 2. Now a different action occurs, involving the application of enabling voltage from stage 2 through OR circuit 116 and wire 118 to AND circuit 112, FIG. 4B. The S clock pulse passes in this instance through AND circuit 112 and OR circuit 130 to a gate 132, which is interposed between output line 42 and a source 134 of "logical 0" signals. Since it is assumed herein that "logical 0" is represented by a negative pulse for transmission purposes, the source 134 may be a negative voltage source. Hence, when an S pulse is applied to the enabled AND circuit 112, the gate 132 passes a negative voltage pulse to the output line to represent a 0 in the transmitted bit sequence.

Thus, as the setting of counter 96 is incremented from 0 to 7 by the repeated application of Q pulses thereto, the circuitry just described generates the necessary pulses for representing the code word 11001100, or W1, which is the form in which a "1" data bit is to be transmitted through the output line 42. When the counter setting passes from 7 back to 0, thereby denoting that eight code pulses forming a data word have been transmitted, a pulse is emitted on line 140, FIG. 4A, which has the effect of resetting the flip-flops 88 and 98 to their 0 states. The resetting of flip-flop 88 terminates the transmission of code pulses under the control of counter 96. The resetting of flip-flop 98 enables gate 106 to start conducting R clock pulses again and restores gate 74 to its normal function of conducting the delta-modulated high-frequency signal pulses from shift register 70 to the output line 42. Normal signal transmission therefore is resumed following the transmission of the 8-bit data word W1.

The transmission of a "0" data bit (as represented by the 8-bit data word W2, or 00110011 now will be described briefly. The wire 82, FIG. 4B, is energized, setting flip-flop 144 to its 1 state and thereby partially enabling the AND circuit 146. When the next R clock pulse is emitted, it passes through this AND circuit 146 to set flip-flop 148 into its 1 state, thereby supplying one input voltage to each of the three-input AND circuits 150 and 152. These AND circuits 150 and 152 perform functions similar to those of the above-described AND circuits 114 and 112, respectively. That is to say, they are instrumental in the process of encoding the input data bit to a data word for transmission purposes.

When the R pulse was applied to AND circuit 146, as mentioned above, it also was passed through OR circuit 92 and delay device 94 to reset the counter 96 to 0 and set the flip-flop 98 to 1, FIG. 4A. With flip-flop 98 no longer at 0, further emission of R pulses is blocked by gate 106, and gate 74, FIG. 4B, blocks the transmission of delta-modulated bits passing through the shift register 70, inasmuch as a special data word now is to be substituted for such bits. Through a delay device 154, the R pulse passed by AND circuit 146 also is effective to reset the flip-flop 144 to 0.

To transmit a 0 data bit, a data word W2, 00110011, must be generated. It is apparent from the counter circuitry, shown in FIGS. 4A and 4B, how this is accomplished. In response to the Q clock pulses, the counter setting is increased from 0 to 7 by increments of 1. At counter settings 0, 1, 4 and 3, 5, counter output voltages are passed at "S" clock times through AND circuit 150 and OR circuit 130 to gate 132, which permits logical-0 (negative) pulses to pass from source 134 to the transmitter output line 42. At counter settings 2, 3, 6 and 7, counter output voltages are passed at "S" clock times through AND circuit 152 and OR circuit 124 to gate 126, which permits logical-1 (positive) pulses to pass from source 128 to output line 42. In this way, a sequence of bits 00110011 (W2) is transmitted in lieu of the 8 bits that were stored in shift register 70 as a result of the normal delta-modulation process at the time when the 0 data bit was entered into the system.

As explained above in connection with FIG. 2, the insertion of a data word W1 or W2 (representing a data bit 1 or 0) into the signal transmission will, in most cases, change the cumulative "weight" of the transmitted pulse train and cause the output waveform reconstructed by the receiver to differ from the waveform that would have been received in the absence of this multiplexing operation. The present system automatically makes a weight correction to compensate for any such discrepancy, immediately following the transmission of the data word W1 or W2 as the case may be.

In this connection reference is made to the second shift register 72, FIG. 4B, whose contents generally are identical with those of shift register 70. At the start of a multiplexing operation, shift register 72 stores the 8 bits that will be replaced by the inserted data word W1 or W2. Since it is assumed in the present example that W1 and W2 have net weights of zero, then the net weight of the 8 bits stored in register 72 (i.e., the excess of 1' over 0's) is equal to the difference in weight between the introduced data word and the bit pattern which it replaces. This makes it possible to effect a relatively simple weight correction in the manner described below.

When the operation of introducing a data word is initiated by applying an R clock pulse to the previously conditioned AND circuit 86 or 146, FIG. 4B, this R pulse passes through AND circuit 86 or 146, OR circuit 92 and wire 160 to a gate 162. This enables gate 162 to pass a weight correction signal from an adder 164 through wire 46 to the multiplier 26, FIG. 4A, in the feedback loop of the delta modulator 20. The adder 164 is an analog summing device for ascertaining the weight of the 8-bit sequence or "byte" currently stored in shift register 72, treating each 1 bit stored therein as +1 and each 0 bit as −1 for arithmetical summing purposes. The resultant positive or negative differential voltage then is applied over wire 46 to multiplier 26, where it enters the delta modulator feedback loop. This action occurs concurrently with each introduction of a multiplexed data bit. Its weight-correcting action upon the multiplexed signal waveform has been explained above in connection with FIG. 2D.

Although the aforesaid weight-correcting action occurs at the beginning of a multiplexing operation, before the data word to be introduced is actually generated, its effect upon the transmitted pulse train is deferred until all eight bits of the introduced data word have been transmitted. This is due to the delaying action of the shift register 70, through which all bits of the unmultiplexed delta-modulated bit stream must pass on their way from the delta modulator 20 to the transmitter output line 42. Any change in the composition of the delta-modulated pulse train which is caused by the weight correction signal will not start to manifest itself in the output of the transmitter until at least the preceding 8 bits have been fed out of the shift register 70, by which time the last bit of the 8-bit data word will have been transmitted.

Shortly after the first bit succeeding the data word reaches the final position of shift register 70, and concurrently with the generation of the next succeeding Q clock pulse, the setting of counter 96, FIG. 4A, is advanced from 7 to 0. This causes the counter 96 to emit a pulse which resets flip-flop 98 to 0, thereby restoring the gate 74, FIG. 4B, to its conductive state. The next succeeding S clock pulse then causes the first bit succeeding the data word to be shifted out of register 70 and pass through gate 74 to the output line 42. Normal operation of the transmitter circuitry, as modified by the weight correction, then is resumed.

ALTERATION OF SPURIOUS DATA WORD

As explained above in connection with FIG. 3, it is not desirable that the system be permitted to transmit any pulse pattern generated by delta modulator 20 which inadvertently happens to resemble the pulse pattern of a data word W1 or W2. If such a pulse pattern were included in an unmultiplexed high-frequency signal transmission, it would be erroneously treated by the receiver as a piece of digital information apart from the high-frequency signal. In view of this, the present system includes provision for automatically altering any 8-bit sequence generated by delta modulator 20 which is identical with the bit pattern of a data word W1 or W2. This may be accomplished by changing any of the eight bits in the sequence, thereby destroying the identity between this bit sequence and a data word.

Referring now to FIG. 4B, it will be noted that each stage of the shift register 70 has 1 and 0 output leads, one or the other of which is energized depending upon whether a 1 bit or 0 bit is currently stored in that stage. Half of these output leads are connected as input lines to an AND circuit 170 in a manner such that this AND circuit 170 becomes conductive if, and only if, the sequence of bits which is currently stored in the shift register awaiting transmission resembles a particular data word, say W1. In similar fashion, the remaining output leads are connected as input lines to an AND circuit 172, which is rendered conductive if the 8-bit sequence stored in register 70 resembles the other data word, e.g., W2.

The outputs of the AND circuits 170 and 172 are applied respectively as inputs to the AND circuits 174 and 176, the other input to each of which is an R clock pulse. At R clock time, if a coincidence exists between a data word W1 or W2 and the pattern of the bits awaiting transmission in shift register 70, one or the other of the AND circuits 174 and 176 will pass this R pulse through a wire 178 or 180, respectively, to the 0 or 1 input terminal of the flip-flop in one of the shift register stages. The scheme is such that the bit currently stored in that register stage will be inverted. Only 1 bit of the pattern need be invented to prevent this bit pattern from being mistaken for a data word by the special word detector 50 in the receiver 14, FIG. 1. (The detector 50 has a decoding logic similar to that of the just-described decoding circuitry associated with shift register 70, FIG. 4B.) Alteration of the bit in question disables the logical circuit connections which were established to effect this alteration in the first instance, so that the succeeding R pulses will not effect any further, unwanted alterations.

The choice of the register stage in which the bit alteration will take place is arbitrary. For illustration, the input stage at the trailing end of register 70 (i.e., the one most remote from the transmitting gate 74) has been chosen. Alteration of the trailing bit has the advantage of minimizing the time during which the altered waveform deviates from the unaltered waveform (FIG. 3C). However, the arrangement could be such that the altered bit is the leading bit rather than the trailing bit of the series, so that it cannot remain in register 70 to become part of another spurious data word which would not have been formed except for such alteration. This is an optional matter.

When a bit value has been altered as described above, a compensating weight correction usually is entered into the feedback loop of the delta modulator 20 through a wire 64 or 65, FIGS. 4A and 4B. Assume, for example, that the trailing bit of the 8-bit series stored in register 70 is changed from 0 to 1. This occurs under conditions where the AND circuits 170 and 174 are active, and an R pulse consequently is passed through wire 180 to the "1" input terminal of register flip-flop. As a result of this action, the bit series actually transmitted to the receiver will have a cumulative weight that is higher than it should be for accurate representation of the high-frequency signal. To compensate for this, the portion of the pulse train immediately following the altered 8-bit sequence is weighted negatively for a limited time to bring the reconstructed waveform back down to its proper level. An action of this kind is shown in FIG. 3C. On the other hand, if the conditions are such that the wire 178, FIG. 4B, is energized for changing the trailing bit of the sequence from 1 to 0, the transmitted bit sequence then will lower than it should be, and the ensuing part of the pulse train is now weighted positively for a limited time to correct the reconstructed waveform.

To consider this weight-correcting action in detail, if the AND circuit 174, FIG. 4B is active when the R clock pulse is applied thereto, this pulse passes through wire 184 to a flip-flop 186, setting this flip-flop to its 1 state and thereby conditioning an AND circuit 188 for conduction. Then, when the next succeeding S clock pulse is generated, it passes through the AND circuit 188 to a gate 190 interposed between the wire 65 and a source 192 of negative voltage. As a result of this action, a negative voltage pulse is sent through wire 65 to the multiplier 26 in the feedback loop of the delta modulator 20, FIG. 4A. This effects a reduction in the level of the delta-modulated voltage pulses until the pulse train again truly represents the high-frequency signal. This action is of limited duration. When the flip-flop 186, FIG. 4B, was set to 1, it sent a reset signal through a delay device 194 back to its 0 input terminal, thereby switching itself back to a 0 state before the next S pulse can be applied to the AND circuit 188.

If the AND circuit 176, FIG. 4B, in the alteration circuitry is active when an R clock pulse is applied thereto, the R pulse passes through this AND circuit and a wire 200 to flip-flop 202 setting this flip-flop to 1 and thereby conditioning AND circuit 204 to pass the next S clock pulse to gate 206, which is interposed between wire 64 and a positive voltage source 208. This places a positive pulse on wire 64 leading to the multiplier 26, FIG. 4A, in the delta modulator feedback loop. Thus, the voltage level of the delta-modulated signal pulses is raised in order to restore the correct configuration to the waveform that will be reconstructed from these pulses. The flip-flop 202 resets itself through a delay device 210.

As was true in the case of the weight correcting function of the multiplexing operation previously described, the weight correcting function of the bit alteration process will not become manifested in the transmitted signal until all of the bits stored in the shift register 70 at the time of alteration have been transmitted. If the system is designed to alter the trailing bit of this series, as shown in FIG. 4B (wires 178 and 180), then the weight correction could take effect immediately following the transmission of the altered bit; otherwise it will be deferred by at least the number of bit positions trailing the alteration point in register 70.

There may be a rare occasion when the shift register 70, FIG. 4B, contains a sequence of bits identical with a data word W1 or W2 at the exact time when a data word W1 or W2 is to be introduced into the signal transmission. Under these conditions it will be desirable to suppress the weight-correcting action of the alteration circuitry. Inasmuch as the data word to be transmitted has the same weight (i.e., zero) as the bit sequence currently stored in the shift register 70, which it will replace, no weight correction is needed. Referring to FIG. 4B, when either of the flip-flops 88 and 148 is set to 1, indicating that data is to be inserted into the transmission, this will disable an AND circuit 212 through which an enabling input is supplied to each of the AND circuits 188 and 204, via wire 214. Such action disables that part of the alteration circuitry which furnishes weight correction signals to the delta modulator. It does not prevent the bit in the trailing position of shift register 70 from being altered, but this action is inconsequential because the entire series of bits currently stored in register 70 is discarded when a data word is introduced by the multiplexing circuitry. The weight correcting feature of the multiplexing circuitry is operative but will effect no weight change in this instance, since the weight of the data word is identical with that of the word it replaces.

ADAPTIVE DELTA MODULATION

It has been mentioned hereinabove that the low-frequency data which is multiplexed into the high-frequency signal transmission may be used for a variety of purposes, one of which is to control the magnitude of the multiplication factors in the multipliers 26 and 27, FIGS. 4A and 1. This feature will be found useful in delta-modulation systems of the adaptive or self-training type for regulating the size of the delta increment ($\Delta$) in accordance with environmental conditions.

While the invention has been particularly shown and described with reference to a preferred embodiment thereof, it will be understood by those skilled in the art that various changes in form and details may be made therein without departing from the spirit and scope of the invention.

What is claimed is:

I claim

1. A method of communicating a digitized analog signal multiplexed with a digital information signal whose bit transmission frequency is on the average much lower than that of the digitized analog signal, said method comprising the steps of:

a. generating a delta-modulated signal wherein the input analog signal is represented as a stream of bits occurring at high frequency;
b. introducing at random times into said bit stream selected bit patterns which distinctively represent portions of said low-frequency information signal, such introduced bit patterns replacing portions of said bit stream that otherwise would represent coincident parts of said analog signal;
c. recognizing each of said introduced bit patterns, irrespective of where it occurs in the bit stream, as uniquely pertaining to said information signal;
d. comparing the numerical weight of each introduced bit pattern with the numerical weight of the portion of the bit stream which it replaces; and
e. modifying the delta modulation process of step *a* in accordance with the result of such comparison.

2. A method of communicating a digitized analog signal multiplexed with a digital information signal whose bit transmission frequency is on the average much lower than that of the digitized analog signal, said method comprising the steps of:

a. generating a delta-modulated signal wherein the input analog signal is represented as a stream of bits occurring at high frequency;
b. introducing at random times into said bit stream selected bit patterns which distinctively represent portions of said low-frequency information signal, such introduced bit patterns replacing portions of said bit stream that otherwise would represent coincident parts of said analog signal;
c. recognizing each of said introduced bit patterns, irrespective of where it occurs in the bit stream, as uniquely pertaining to said information signal;
d. detecting the presence in said bit stream, prior to its transmission, of a bit pattern identical with any of said selected bit patterns but which occurs at a time when no such bit pattern has been introduced into said bit stream by the performance of step *b;*
e. altering such detected bit pattern so that when transmitted, it will not be identical with any of said selected bit patterns; and
f. modifying the delta modulation process (step *a* ) in accordance with the difference between the respective numerical weights of the last-mentioned bit pattern before and after its alteration.

3. In a communication system of the type wherein a digitized analog signal requiring a high bit transmission frequency is multiplexed with a digital information signal that requires on the average a much lower bit transmission frequency, the combination of:

a. delta modulating means for generating a stream of bits occurring at high frequency to represent an input analog signal;
b. means for introducing at random times into said bit stream selected bit patterns which distinctively represent portions of said low-frequency information signal, such introduced bit patterns replacing portions of said bit stream that otherwise would represent coincident parts of said analog signal;
c. means for recognizing each of said introduced bit patterns, irrespective of where it occurs in the bit stream, as uniquely pertaining to said information signal;
d. means for generating a correction signal according to the difference between the numerical weight of each bit pattern introduced by means *b* and the numerical weight of the portion of the bit stream which it replaces; and
e. means applying said correction signal to said modulating means (*a*) for modifying the portion of the bit stream succeeding each introduced bit pattern, thereby to compensate for said difference in weights.

4. In a communication system of the type wherein a digitized analog signal requiring a high bit transmission frequency is multiplexed with a digital information signal that requires on the average a much lower bit transmission frequency, the combination of:

(a) delta modulating means for generating a stream of bits occurring at high frequency to represent an input analog signal;
(b) means for introducing at random times into said bit stream selected bit patterns which distinctively represent portions of said low-frequency information signal, such introduced bit patterns replacing portions of said bit stream that otherwise would represent coincident parts of said analog signal;
(c) means for recognizing each of said introduced bit patterns, irrespective of where it occurs in the bit stream, as uniquely pertaining to said information signal;
(d) means operable at times when no bit pattern is being introduced into said bit stream by means *b* for detecting a bit pattern identical with any of said selected bit patterns in the part of said stream which is to be transmitted;
(e) means for altering such detected bit pattern so that when transmitted, it will not be identical with any of said selected bit patterns; and
f. means for modifying the operation of said delta modulating means in accordance with the difference between the respective numerical weights of each detected bit pattern before and after its alteration.

5. Transmitting apparatus for generating a pulsed output signal to represent a first input signal whose amplitude is subject to high-frequency variations and a second input signal having pulsed amplitude variations that occur at random times and at a maximum frequency much lower than that of said first input signal, said apparatus comprising:

a. a delta modulator for generating binary pulses at high frequency to represent the amplitude variations of said first input signal;
b. an output line for the signal generated by said transmitting apparatus;
c. storage means interposed between said delta modulator and said output line and normally effective to store as a binary sequence of given length the pulses generated by said delta modulator which are being passed to said output line;
d. pulse pattern generating means controlled by said second input signal for supplying to said output line a pulse sequence of said given length having a distinctive binary pattern in response to each pulse of a given binary type which occurs in said second input signal;
e. gating means effective whenever said output line is receiving pulses from said pulse pattern generator to prevent said line from receiving the pulses which coincidentally have passed through said storage means, thereby enabling the distinctive pulse pattern which represents the second signal pulse to replace a pulse pattern that otherwise would be supplied by said modulator to said output line;
f. weight determining means for ascertaining the difference between the respective numerical weights of the pulse sequence supplied to said output line by said pulse pattern generating means and the pulse sequence that otherwise would have been supplied to said line from said modulator by way of said storage means; and
g. weight correcting means for modifying the operation of said delta modulator in accordance with the weight differential thus ascertained.

6. Transmitting apparatus for generating a pulsed output signal to represent a first input signal whose amplitude is subject to high-frequency variations and a second input signal having pulsed amplitude variations that occur at random times and at a maximum frequency much lower than that of said first input signal, said apparatus comprising:
a. a delta modulator for generating binary pulses at high frequency to represent the amplitude variations of said first input signal;
b. an output line for the signal generated by said transmitting apparatus;
c. storage means interposed between said delta modulator and said output line and normally effective to store as a binary sequence of given length the pulses generated by said delta modulator which are being passed to said output line;
d. pulse pattern generating means controlled by said second input signal for supplying to said output line a pulse sequence of said given length having a distinctive binary pattern in response to each pulse of a given binary type which occurs in said second input signal;
e. gating means effective whenever said output line is receiving pulses from said pulse pattern generator to prevent said line from receiving the pulses which coincidentally have passed through said storage means, thereby enabling the distinctive pulse pattern which represents the second signal pulse to replace a pulse pattern that otherwise would be supplied by said modulator to said output line;
f. sensing means for detecting the presence in said storage means of a pulse sequence representation having a pattern identical with that of a pulse sequence that would be generated by said pulse pattern generating means;
g. means controlled by said sensing means for altering the pattern of pulses stored in said storage means whenever such identity is found to exist; and
h. weight correcting means for modifying the operation of said delta modulator in accordance with the difference between the respective numerical weights of said stored pulse pattern before and after its alteration.

7. Apparatus for transmitting a bit stream which represents in digital form a first input signal having high-frequency amplitude variations multiplexed with a second input signal having randomly timed amplitude variations representing bits that occur at a maximum frequency much lower than that of the bits representing said first input signal, said apparatus comprising:
a. a delta modulator for generating bits at high frequency to represent the amplitude variations of said first input signal;
b. an output line for transmitting the signal generated by said apparatus;
c. a shift register interposed between said delta modulator and said output line for storing in sequence the bits generated by said delta modulator;
d. data word generating means responsive to each bit of a given binary type which occurs in said second input signal for supplying to said output line a data word consisting of a bit sequence having a distinctive pattern to represent such an input bit;
e. gating means interposed between said output line and the exit stage of said shift register, said gating means normally being effective to pass bits successively from said exit stage to said output line but preventing such passage while said output line is receiving a data word from said generating means *d;*
f. weight determining means for ascertaining the difference between the numerical weight of each data word generated by means *d* and the numerical weight of the bit sequence of corresponding length stored in said shift register at the time when generation of said data word commences; and
g. weight correction means for controlling the operation of said delta modulator in accordance with the weight differential ascertained by means *f* so that the portion of the transmitted bit stream which follows each data word is consistent with the waveform of said first input signal.

8. Apparatus for transmitting a bit stream which represents in digital form a first input signal having high-frequency amplitude variations multiplexed with a second input signal having randomly timed amplitude variations representing bits that occur at a maximum frequency much lower than that of the bits representing said first input signal, said apparatus comprising:
a. a delta modulator for generating bits at high frequency to represent the amplitude variations of said first input signal;
b. an output line for transmitting the signal generated by said apparatus;
c. a shift register interposed between said delta modulator and said output line for storing in sequence the bits generated by said delta modulator;

d. data word generating means responsive to each bit of a given binary type which occurs in said second input signal for supplying to said output line a data word consisting of a bit sequence having a distinctive pattern to represent such an input bit;

e. gating means interposed between said output line and the exit stage of said shift register, said gating means normally being effective to pass bits successively from said exit stage to said output line but preventing such passage while said output line is receiving a data word from said generating means *d;* f. sensing means for detecting the presence in said shift register of a bit sequence having a pattern identical with that of a data word of the type generated by means *d;* g. alteration means controlled by said sensing means for inverting at least one of the bit representations stored in said shift register when such identity is detected by said sensing means; and h. weight correcting means for modifying the operation of said delta modulator in accordance with the change in weight of the bit pattern stored in said shift register due to said bit inversion.

* * * * *